(12) United States Patent
Hosono

(10) Patent No.: US 8,219,139 B2
(45) Date of Patent: Jul. 10, 2012

(54) RADIO BASE STATION ACCOMMODATING METHOD AND NETWORK DEVICE

(75) Inventor: Hiroyuki Hosono, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 0 days.

(21) Appl. No.: 12/996,529

(22) PCT Filed: Jun. 5, 2009

(86) PCT No.: PCT/JP2009/060383
§ 371 (c)(1),
(2), (4) Date: Feb. 17, 2011

(87) PCT Pub. No.: WO2009/148162
PCT Pub. Date: Dec. 10, 2009

(65) Prior Publication Data
US 2011/0164660 A1 Jul. 7, 2011

(30) Foreign Application Priority Data
Jun. 6, 2008 (JP) ................................ 2008-149969

(51) Int. Cl.
*H04M 1/00* (2006.01)
(52) U.S. Cl. .................. 455/550.1; 455/561; 455/426.1; 370/328
(58) Field of Classification Search ............... 455/550.1, 455/426.1, 561; 370/328
See application file for complete search history.

(56) References Cited

U.S. PATENT DOCUMENTS

| | | | |
|---|---|---|---|
| 2007/0097938 A1 | 5/2007 | Nylander et al. | |
| 2007/0097939 A1 | 5/2007 | Nylander et al. | |
| 2007/0097983 A1 | 5/2007 | Nylander et al. | |
| 2007/0105527 A1 | 5/2007 | Nylander et al. | |
| 2007/0105568 A1 | 5/2007 | Nylander et al. | |
| 2007/0147370 A1* | 6/2007 | Hasegawa | ...... 370/390 |
| 2007/0183427 A1 | 8/2007 | Nylander et al. | |
| 2007/0242763 A1* | 10/2007 | Li et al. | .......... 375/260 |
| 2008/0102877 A1 | 5/2008 | Suemitsu et al. | |
| 2008/0139241 A1* | 6/2008 | Kiyomoto | .......... 455/552.1 |
| 2008/0253343 A1* | 10/2008 | Sasao | ............ 370/338 |

FOREIGN PATENT DOCUMENTS

| | | |
|---|---|---|
| JP | 2006 261722 | 9/2006 |
| JP | 2006 324831 | 11/2006 |
| JP | 2007 266785 | 10/2007 |
| WO | 2006 117838 | 11/2006 |
| WO | 2007 040454 | 4/2007 |

OTHER PUBLICATIONS

"Requirements for LTE Home eNodeBs, 3GPP TSG RAN #35", RP-070209, Orange, TELECOM Italia, T-Mobile, VODAFONE, Agenda Item 10-19, Discussion & Decision, Total pp. 4, (Mar. 6-9, 2007).
International Search Report issued Jul. 7, 2009 in PCT/JP09/060383 filed Jun. 5, 2009.

* cited by examiner

*Primary Examiner* — Danh Le
(74) *Attorney, Agent, or Firm* — Oblon, Spivak, McClelland, Maier & Neustadt, L.L.P.

(57) ABSTRACT

A radio base station accommodating method according to the present invention includes step A of causing a network device 100 to judge a type of a radio base station 200, 201 upon receipt of a connection request from the radio base station 200, 201, step B of causing the network device 100 to generate an operation parameter to be set in the radio base station 200, 201 by using a method which is different depending on each type of the radio base station 200, 201 and to notify the radio base station 200, 201 of the operation parameter, and step C of causing the radio base station to start operation by using the operation parameter thus notified.

9 Claims, 4 Drawing Sheets

| CELL ID | SPREADING CODE | RECEPTION LEVEL |
|---------|----------------|-----------------|
| 202     | 1              | −90 dBm         |
| 203     | 7              | −102 dBm        |
| 204     | 9              | −95 dBm         |

RADIO BASE STATION ACCOMMODATING METHOD AND NETWORK DEVICE

TECHNICAL FIELD

The present invention relates to a radio base station accommodating method and a network device for accommodating radio base stations in a mobile communication system.

BACKGROUND ART

In a mobile communication system, in general, a radio base station for public communications is configured to be operated and managed by a network administrator constantly after start of its operation in order to meet connection requests issued at random from mobile stations.

For example, the network administrator performs the following work for starting the operation of the radio base station for public communications.

(1) A communication line between the radio base station for public communications and an upper node (radio control device, for example) is opened by turning on the radio base station after installation, wire connection and the like of the radio base station.

(2) Operation parameters to be used in the radio base station for public communications are set in the radio control device via a network or by direct manual input.

The operation parameters to be used in the radio base station for public communications described above are set, as configuration data, mainly in the radio control device connected to the radio base station for public communications. The configuration data stores therein operation parameters to be set in each radio base station for public communications (cell).

Note that, basically the same operation as that for the radio base station for public communications is expected to be performed also for a radio base station placed in a small-sized area such as a house, like the one called a "home radio base station (Home eNB)."

SUMMARY OF THE INVENTION

However, a home radio base station is supposed to be set up by the user himself/herself. Moreover, numerous home radio base stations are expected to be installed. Hence, it is considered hard for the network administrator to design operation parameters according to an installation location by performing radio wave measurement of a surrounding area, area simulation, and the like, as in the case of the radio base station for public communications in the past.

The present invention has been therefore made in view of the aforementioned problem. An objective of the present invention is to provide a radio base station accommodating method and a network device which allow a method of setting operation parameters to be changed between a home radio base station and a radio base station for public communications.

The first feature of the present invention is summarized in that a radio base station accommodating method for accommodating a radio base station in a mobile communication system, the method including step A of causing a network device to judge a type of the radio base station upon receipt of a connection request from the radio base station; step B of causing the network device to generate an operation parameter to be set in the radio base station by using a method which is different depending on each type of the radio base station and to notify the radio base station of the operation parameter; and step C of causing the radio base station to start operation by using the operation parameter thus notified.

In the first feature of the present invention, if judging that the radio base station is a radio base station for public communications in the step A, the network device may notify the radio base station of a previously-set parameter as the operation parameter in the step B, and if judging that the radio base station is a home radio base station in the step A, the network device may generate the operation parameter on the basis of information indicating a surrounding environment acquired from the radio base station and notifies the radio base station of the operation parameter.

The second feature of the present invention is summarized in that a network device used in a radio base station accommodating method for accommodating a radio base station in a mobile communication system, the device including a judgment unit configured to judge a type of the radio base station upon receipt of a connection request from the radio base station, and a generation/notification unit configured to generate an operation parameter to be set in the radio base station by using a method which is different depending on each type of the radio base station and to notify the radio base station of the operation parameter.

In the second feature of the present invention, if the judgment unit judges that the radio base station is a radio base station for public communications, the generation/notification unit may notify the radio base station of a previously-set parameter as the operation parameter, and if the judgment unit judges that the radio base station is a home radio base station, the generation/notification unit may generate the operation parameter on the basis of information indicating a surrounding environment acquired from the radio base station and notifies the radio base station of the operation parameter.

In the second feature of the present invention, the judgment unit may manage judgment information for each radio base station identifier for identifying the radio base station or for each cell identifier for identifying a cell under control of the radio base station, the judgment information indicating whether the radio base station is the radio base station for public communications or the home radio base station, and the judgment unit may judge the type of the radio base station on the basis of any one of the radio base station identifier and the cell identifier included in the connection request.

In the second feature of the present invention, the network device may further include an acquisition unit configured to acquire a measurement result from the radio base station as the information indicating a surrounding environment, the measurement result being a result of measurement on a common control signal transmitted by a neighboring radio base station of the radio base station.

In the second feature of the present invention, the information indicating the surrounding environment includes at least one of a reception level of a common control signal transmitted by a neighboring radio base station of the radio base station, a signal to interference plus noise power ratio of the common control signal, propagation loss of the common control signal in the radio base station, delay time of the common control signal in the radio base station, a radio base station identifier for identifying the neighboring radio base station, and a cell identifier for identifying a cell under control of the neighboring radio base station.

In the second feature of the present invention, if the judgment unit judges that the radio base station is the home radio base station, the generation/notification unit may generate at least one of a spreading code, neighboring cell list, frequency, and transmission timing as the operation parameter.

In the second feature of the present invention, the generation/notification unit may select a spreading code not used for transmission of a common control signal by a neighboring radio base station of the radio base station, as the spreading code, with reference to the information indicating the surrounding environment.

In the second feature of the present invention, the generation/notification unit may include a cell, to which a common control signal is transmitted, in the neighboring list with reference to the information indicating the surrounding environment.

In the second feature of the present invention, if the judgment unit judges that the radio base station is the home radio base station, the generation/notification unit may notify the radio base station of a previously-set parameter in addition to the generated operation parameter.

As described above, according to the present invention, it is possible to provide a radio base station accommodating method and a network device which allow a method of setting operation parameters to be changed between a home radio base station and a radio base station for public communications.

BEST MODE FOR CARRYING OUT THE INVENTION (Configuration of Mobile Communication System According to First Embodiment of Present Invention)

A configuration of a mobile communication system according to a first embodiment of the present invention is described with reference to FIGS. 1 through 4.

Figures 3, 4:
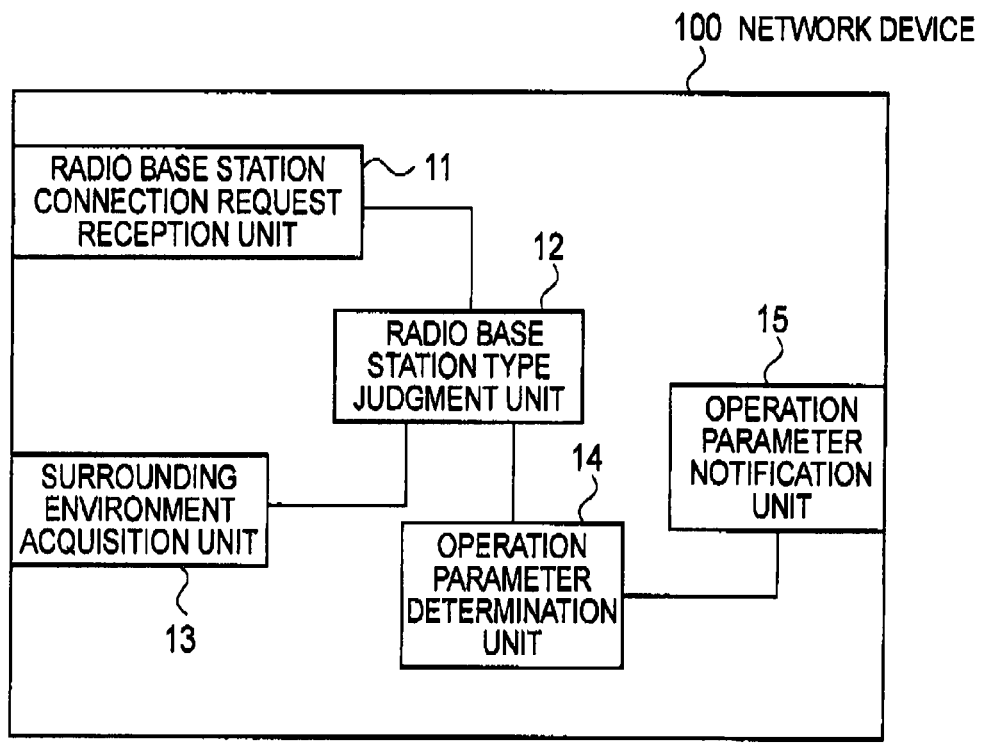
FIG. 3 is a functional block diagram of a radio control device according to the first embodiment of the present invention.
FIG. 4 is a diagram showing an example of a surrounding environment of the radio base station acquired by the radio control device according to the first embodiment of the present invention.

As shown in FIG. 4, the mobile communication system according to this embodiment includes a network device 100, a security device SGW (Security Gateway) 400, and radio base stations 200 and 201.

Here, the radio base stations 200 and 201 are accommodated in the network device 100. Further, the network device 100 is configured to assign each of the radio base stations 200 and 201 operation parameters to be used in radio communications between the corresponding one of the radio base stations 200 and 201 and a mobile station 300, and to manage the operation parameters.

Here, if the mobile communication system according to this embodiment is a W-CDMA mobile communication system, the function of the network device 100 is installed in a radio control device RNC.

Note that, the radio base station 200 is a radio base station for public communications which is placed in a mobile carrier network managed by a network administrator (mobile operator); the radio base station 201 is a home radio base station under management of a user who subscribes to a communication service provided by the network administrator (mobile carrier).

For example, the radio base station 201 is sometimes installed in a LAN (Local Area Network) managed by the aforementioned user, and connected to the radio control device 100 on the mobile carrier network via an FTTH or ADSL access carrier network.

Meanwhile, the SGW 400 is placed at the boundary of the mobile carrier network. The SGW 400 is a gateway device for protecting the mobile carrier network against unauthorized access from other networks, and is configured to allow only the access authorized through an authentication procedure to the mobile carrier network.

Figure 1:
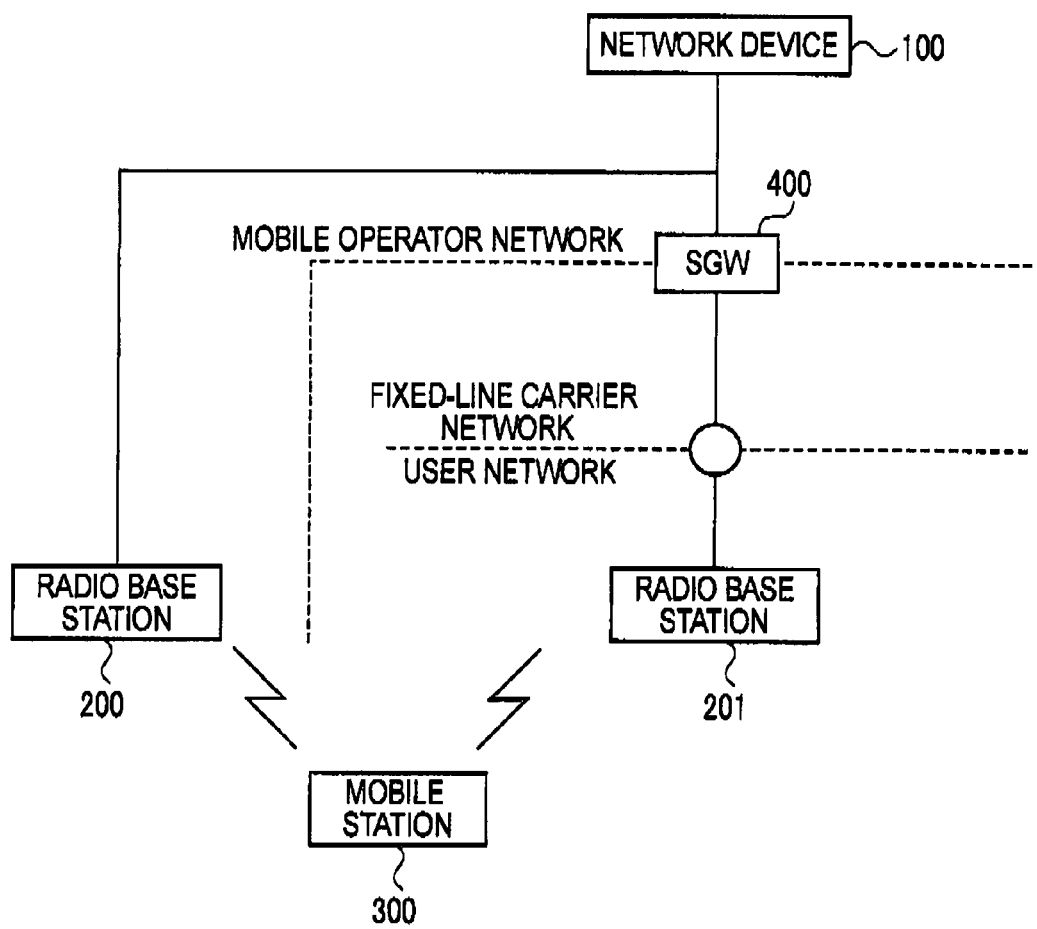
FIG. 1 is an overall configurational view showing a mobile communication system according to a first embodiment of the present invention.
Figure 2:
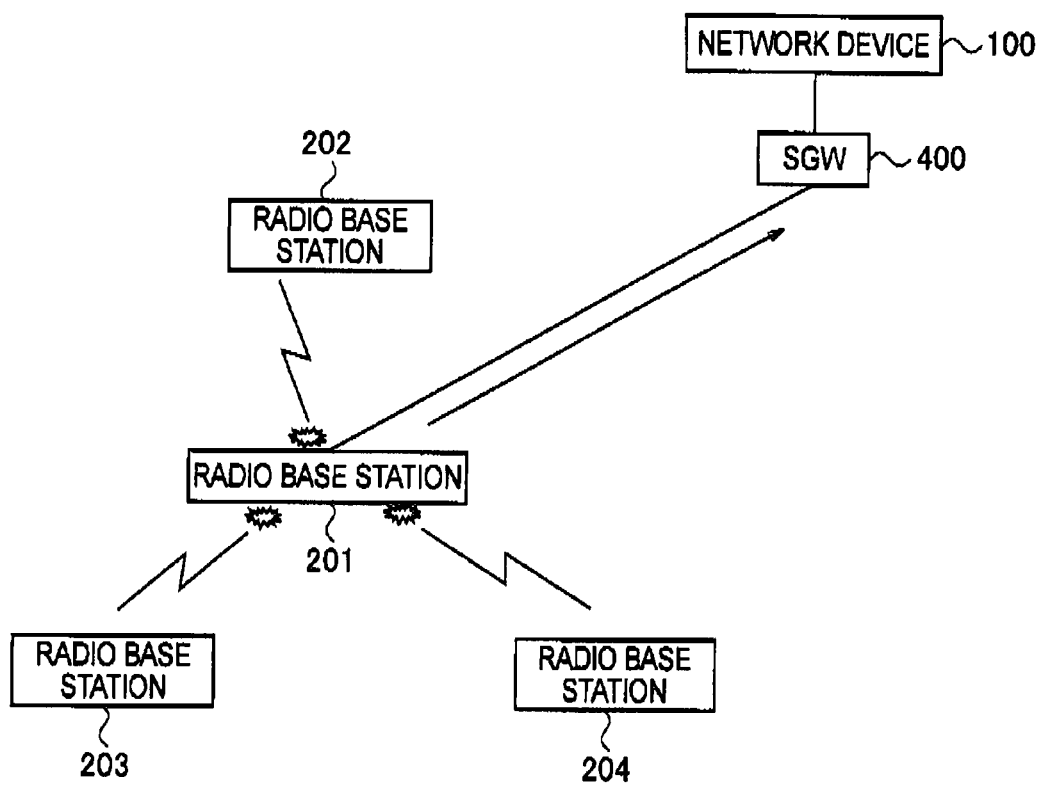
FIG. 2 is a view illustrating an operation of a radio base station according to the first embodiment of the present invention.

As shown in FIG. 2, the radio base station 201 is also configured to notify the network device 100 of a result of measurement on common control signals transmitted by neighboring radio base stations 202 to 204 of the radio base station 201 as "information indicating a surrounding environment," in response to an instruction from the network device 100.

As the aforementioned "information indicating the surrounding environment," the radio base station 201 may be configured to notify at least one of a reception level of a common control signal transmitted by each of the neighboring radio base stations 202 to 204 of the radio base station 201, a signal to interference plus noise power ratio (SIR) of the common control signal, propagation loss of the common control signal in the radio base station 201, delay time of the common control signal in the radio base station 201, a radio base station identifier for identifying the corresponding one of the neighboring radio base stations 202 to 204, and a cell identifier for identifying a cell under control of the corresponding one of the neighboring radio base stations 202 to 204, for example.

As shown in FIG. 3, the network device 100 according to this embodiment includes a radio base station connection request reception unit 11, a radio base station type judgment unit 12, a surrounding environment acquisition unit 13, an operation parameter determination unit 14, and an operation parameter notification unit 15.

The radio base station connection request reception unit 11 is configured to receive connection requests transmitted by the radio base stations 200 and 201.

The radio base station type judgment unit 12 is configured to judge types of the radio base stations 200 and 201 upon receipt of the connection requests from the radio base stations 200 and 201 by the radio base station connection request reception unit 11.

For example, the radio base station type judgment unit 12 is configured to judge whether each of the radio base stations 200 and 201 from which the aforementioned connection requests have been transmitted is a radio base station for public communications (first radio base station) or a home radio base station (second radio base station).

Here, the radio base station type judgment unit 12 may be configured to manage judgment information for each radio base station identifier for identifying a radio base station or for each cell identifier for identifying a cell under control of the radio base station, the judgment information indicating whether the radio base station is a radio base station for public communications or a home radio base station, and to judge the type of the radio base station on the basis of a radio base station identifier or a cell identifier included in the corresponding connection request described above.

The surrounding environment acquisition unit 13 is configured to acquire information indicating the surrounding environment of the radio base station 201, from the radio base station 201 having been judged by the radio base station type judgment unit 12 to be a home radio base station.

For example, the surrounding environment acquisition unit 13 may be configured to transmit a surrounding environment recognition instruction to the radio base station 201 having been judged by the radio base station type judgment unit 12 to be a home radio base station, and to thereby acquire a result of measurement on common control signals transmitted by one or more neighboring radio base stations of the radio base station 201 as the information indicating the surrounding environment of the radio base station 201.

FIG. 4 shows an example of the information indicating the surrounding environment of the radio base station 201 acquired by the surrounding environment acquisition unit 13.

The operation parameter determination unit 14 is configured to generate operation parameters to be set in the radio base stations 200 and 201 by using methods different for the respective types of the radio base stations 200 and 201.

For example, the operation parameter determination unit 14 is configured to determine previously-set parameters as the operation parameters for the radio base station 200 having been judged by the radio base station type judgment unit 12 to be a radio base station for public communications.

The operation parameter determination unit 14 is also configured to generate operation parameters on the basis of the information indicating the surrounding environment acquired by the surrounding environment acquisition unit 13, for the radio base station 201 having been judged by the radio base station type judgment unit 12 to be a home radio base station.

Here, the operation parameter determination unit 14 may be configured to generate at least one of a spreading code, neighboring cell list, frequency, and transmission timing as the operation parameters for the radio base station 201 having been judged by the radio base station type judgment unit 12 to be a home radio base station.

The operation parameter determination unit 14 may also be configured to refer to the information indicating the surrounding environment acquired by the surrounding environment acquisition unit 13, and to select a spreading code not used for transmission of the common control signals by the neighboring radio base stations 202 to 204 of the radio base station 201 judged by the radio base station type judgment unit 12 to be a home radio base station, as a spreading code which is one of the operation parameters.

The operation parameter determination unit 14 may also be configured to refer to the information indicating the surrounding environment acquired by the surrounding environment acquisition unit 13, and to include a cell, to which the common control signal is transmitted, in a neighboring list which is one of the operation parameters.

Further, the operation parameter notification unit 15 is configured to notify each of the radio base stations 200 and 201 of the operation parameters thus determined by the operation parameter determination unit 14.

Here, the operation parameter notification unit 15 may be configured to notify the radio base station 201 having been judged by the radio base station type judgment unit 12 to be a home radio base station, of previously-set parameters in addition to the operation parameters determined by the operation parameter determination unit 14.

(Operation of Mobile Communication System According to First Embodiment of Present Invention)

Figure 5:
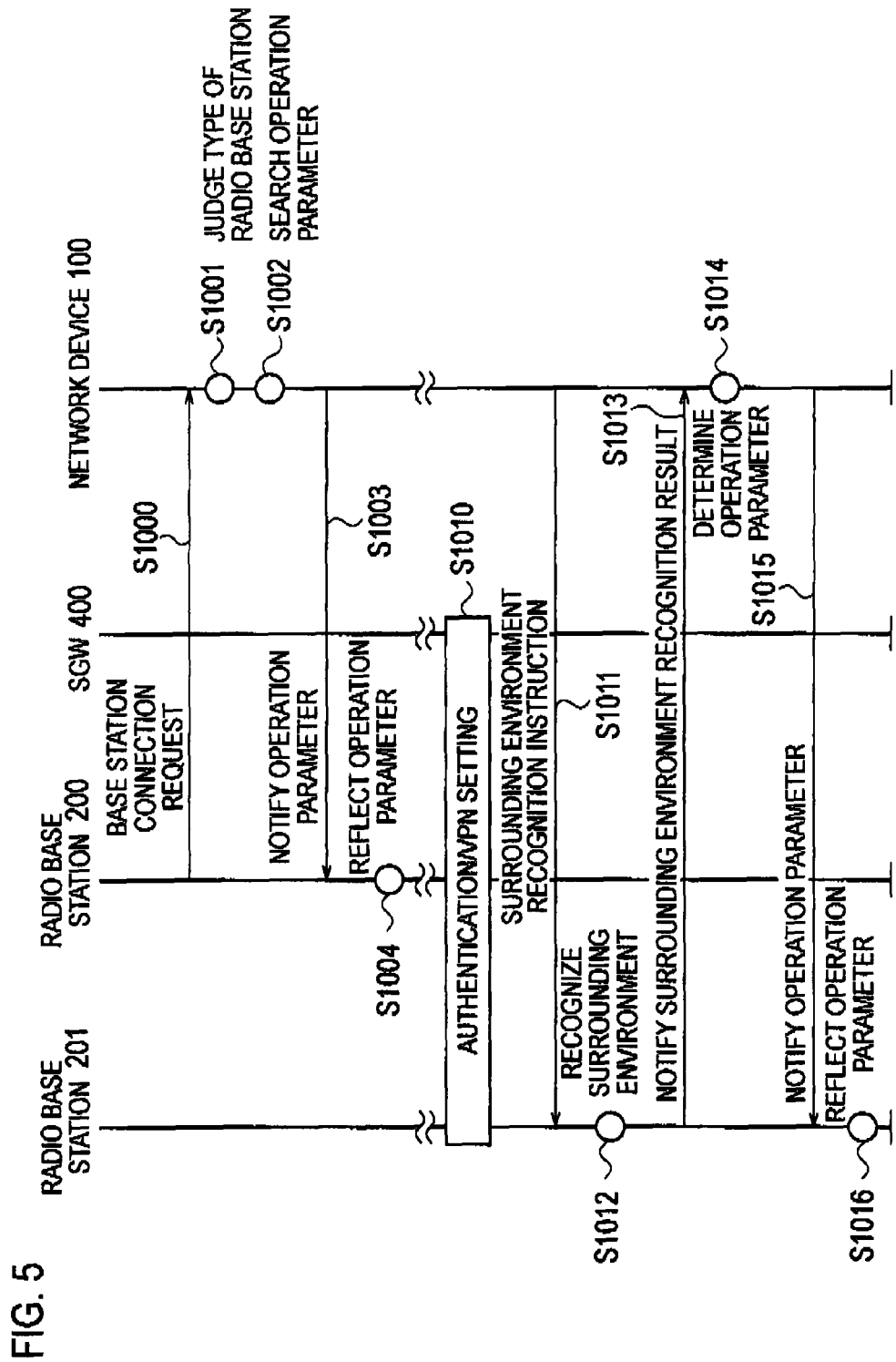
FIG. 5 is a sequence diagram showing an operation of the mobile communication system according to the first embodiment of the present invention.

With reference to FIG. 5, description is given of an operation of the mobile communication system according to the first embodiment of the present invention, i.e., an operation observed since the radio base station 200 is installed until the radio base station 200 is accommodated in the mobile communication system (mobile carrier network).

As shown in FIG. 5, in Step S1000, the radio base station 200 being a radio base station for public communications is installed manually by a network administrator (maintenance person) as in the conventional method, and then transmits a radio base station connection request to the network device 100.

Meanwhile, in Step S1000, the radio base station 200 being a home radio base station is installed manually by an owner (user) of the radio base station 201, and then transmits a radio base station connection request to the network device 100.

In Step S1001, the network device 100 identifies radio base station identifiers for identifying the radio base stations 200 and 201 from IP addresses from which IP packets including the radio base station connection requests are transmitted, and judges the type of the radio base station 200 on the basis of the radio base station identifier.

Here, if judging that the type of the radio base station 200 is a radio base station for public communications (macro cell radio base station), the network device 100 refers to configuration data in the network device 100 to search operation parameters associated with the radio base station identifier in Step S1002, and notifies the radio base station 200 of the operation parameters thus searched out in Step S1003.

In Step S1004, the radio base station 200 having received the operation parameters notified by the radio base station 100 reboots itself to start its operation while reflecting the operation parameters.

On the other hand, if the network device 100 judges that the type of the radio base station 201 is a home radio base station (home cell radio base station), the SGW 400 executes authentication processing and VPN setting processing for the radio base station 201 in Step S1010, and then the network device 100 transmits a surrounding environment recognition instruction to the radio base station 201 in Step S1011.

The radio base station 201 having received the surrounding environment recognition instruction recognizes its surrounding environment in Step S1012, and notifies the network device 100 of a result of the surrounding environment recognition (information indicating the surrounding environment) in Step S1013.

In Step S1014, the network device 100 automatically determines at least a part of operation parameters to be set in the radio base station 201 on the basis of the information indicating the surrounding environment notified by the radio base station 201.

For example, if the notified information indicating the surrounding environment is information indicating a radio base station identifier (cell identifier), reception level, and spreading code associated with each common control signal as shown in FIG. 4, the network device 100 determines a spreading code different from any of the notified spreading codes #1, 7, and 9 as a spreading code to be allocated to the radio base station 201.

Here, if no available allocatable spreading code exists, the network device 100 determines a spreading code #7 associated with the lowest reception level as a spreading code to be allocated to the radio base station 201.

The network device 100 also includes the notified cell identifiers of the neighboring radio base stations 202 to 204 in a neighboring cell list to be allocated to the radio base station 201.

In Step S1015, the network device 100 notifies the radio base station 201 of the operation parameters automatically determined in Step S1014 and operation parameters (previously-set parameters) acquired by referring to the configuration data of the device itself.

Note that, an example of a method of referring to the configuration data is as follows. As in the case of the radio base station 200, the network device 100 identifies a radio base station identifier for identifying the radio base station 201 from an IP address from which IP packets including the result of the surrounding environment recognition (information indicating the surrounding environment) transmitted from the radio base station 201 are transmitted, and acquires operation parameters associated with the radio base station identifier.

In Step S1016, the radio base station 201 having received the operation parameters reboots itself to start its operation while reflecting the operation parameters.

Note that, although this embodiment shows an example where the network device 100 automatically determines a part of the operation parameters of the radio base station 201, a method of providing a dedicated device for automatically determining operation parameters instead of the network device 100 may be employed.

Further, when the network device 100 receives radio base station connection requests from the multiple radio base stations 200 and 201 at the same time, the network device 100 may set operation parameters in the radio base station 201 judged as a home radio base station after setting operation parameters in the radio base station 200 judged as a radio base station for public communications. The setting order may also be vice versa. The network device 100 may also set operation parameters in both the radio base stations 200 and 201 in parallel.

(Operations and Effects of Mobile Communication System According to First Embodiment of Present Invention)

The mobile communication system according to the first embodiment of the present invention allows setting operation parameters in a radio base station for public communications which is placed inside a mobile carrier network and operation parameters in a home radio base station which is placed outside the mobile carrier network and suited to a small-sized area such as a house, while reducing the labor of a network administrator (mobile carrier).

MODIFIED EXAMPLE

The above embodiment is described taking a W-CDMA mobile communication system as an example. However, the present invention is not limited to such a mobile communication system. For example, the present invention is also applicable to a LTE (Long Term Evolution) mobile communication system.

Here, when the mobile communication system according to this embodiment is a LTE mobile communication system, at least a part of the function of the network device 100 shown in FIG. 3 may be installed in an exchange MME.

Note that, when the mobile communication system according to this embodiment is a LTE mobile communication system and when a concentrator HNB-GW accommodating the radio base station 201 is provided, at least a part of the function of the network device 100 shown in FIG. 3 may be installed in the concentrator HNB-GW.

Further, when the mobile communication system according to this embodiment is a W-CDMA mobile communication system and when the concentrator HNB-GW accommodating the radio base station 201 is provided, at least a part of the function of the network device 100 shown in FIG. 3 may be installed in the concentrator HNB-GW.

Furthermore, when the mobile communication system according to this embodiment is a W-CDMA mobile communication system, at least a part of the function of the network device 100 shown in FIG. 3 may be installed in an exchange station MSC/SGSN.

Incidentally, the operation of the above-mentioned radio base stations 200, 201 and the network device 100 may be implemented by means of hardware, a software module executed by a processor, or a combination of both.

The software module may be provided in a storage medium in any format such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Moreover, the storage medium may be integrated into the processor. Additionally, the storage medium and the processor may be provided in an ASIC. The ASIC may be provided in the base stations 200, 201 and the network device 100. Alternatively, the storage medium and the processor may be provided in the base stations 200, 201 and the network device 100 as a discrete component.

Hereinabove, the present invention has been described in detail using the above embodiments; however, it is apparent to those skilled in the art that the present invention is not limited to the embodiments described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. A radio base station accommodating method for accommodating a radio base station in a mobile communication system, the method comprising:
    step A of causing a network device to judge a type of the radio base station upon receipt of a connection request from the radio base station;
    step B of causing the network device to generate an operation parameter to be set in the radio base station by using a method which is different depending on each type of the radio base station and to notify the radio base station of the operation parameter; and
    step C of causing the radio base station to start operation by using the operation parameter thus notified, wherein
    if judging that the radio base station is a radio base station for public communications in the step A, the network device notifies the radio base station of a previously-set parameter as the operation parameter in the step B, and
    if judging that the radio base station is a home radio base station in the step A, the network device generates the operation parameter on the basis of information indicating a surrounding environment acquired from the radio base station and notifies the radio base station of the operation parameter.

2. A network device used in a radio base station accommodating method for accommodating a radio base station in a mobile communication system, the device comprising:
    a judgment unit configured to judge a type of the radio base station upon receipt of a connection request from the radio base station; and
    a generation/notification unit configured to generate an operation parameter to be set in the radio base station by using a method which is different depending on each type of the radio base station and to notify the radio base station of the operation parameter, wherein if the judgment unit judges that the radio base station is a radio base station for public communications, the generation/notification unit notifies the radio base station of a previously-set parameter as the operation parameter, and if the judgment unit judges that the radio base station is a home radio base station, the generation/notification unit generates the operation parameter on the basis of information indicating a surrounding environment acquired from the radio base station and notifies the radio base station of the operation parameter.

3. The network device according to claim 2, wherein the judgment unit manages judgment information for each radio base station identifier for identifying the radio base station or for each cell identifier for identifying a cell under control of the radio base station, the judgment information indicating whether the radio base station is the radio base station for public communications or the home radio base station, and the judgment unit judges the type of the radio base station on the basis of any one of the radio base station identifier and the cell identifier included in the connection request.

4. The network device according to claim 2, further comprising an acquisition unit configured to acquire a measurement result from the radio base station as the information indicating a surrounding environment, the measurement result being a result of measurement on a common control signal transmitted by a neighboring radio base station of the radio base station.

5. The network device according to claim 4, wherein the information indicating the surrounding environment includes at least one of a reception level of a common control signal transmitted by a neighboring radio base station of the radio base station, a signal to interference plus noise power ratio of the common control signal, propagation loss of the common control signal in the radio base station, delay time of the common control signal in the radio base station, a radio base station identifier for identifying the neighboring radio base station, and a cell identifier for identifying a cell under control of the neighboring radio base station.

6. The network device according to claim 2, wherein, if the judgment unit judges that the radio base station is the home radio base station, the generation/notification unit generates at least one of a spreading code, neighboring cell list, frequency, and transmission timing as the operation parameter.

7. The network device according to claim 6, wherein the generation/notification unit selects a spreading code not used for transmission of a common control signal by a neighboring radio base station of the radio base station, as the spreading code, with reference to the information indicating the surrounding environment.

8. The network device according to claim 6, wherein the generation/notification unit includes a cell, to which a common control signal is transmitted, in the neighboring list with reference to the information indicating the surrounding environment.

9. The network device according to claim 2, wherein, if the judgment unit judges that the radio base station is the home radio base station, the generation/notification unit notifies the radio base station of a previously-set parameter in addition to the generated operation parameter.

* * * * *